No. 757,696. PATENTED APR. 19, 1904.
W. A. TWINING.
GEAR CUTTING MACHINE.
APPLICATION FILED JAN. 27, 1902.
NO MODEL. 3 SHEETS—SHEET 1.
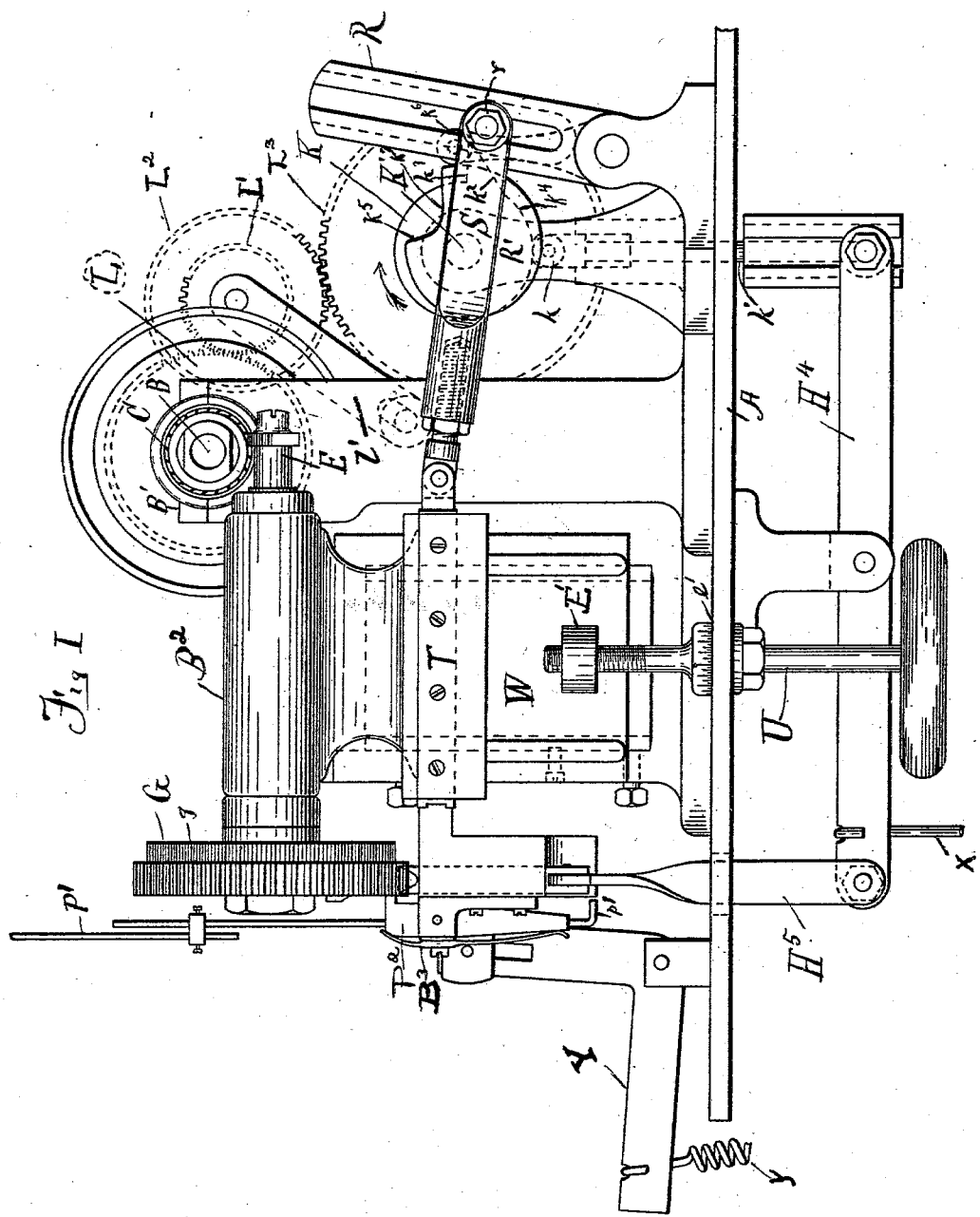
Witnesses:
A. L. Lord.
E. B. Donnelly.
Inventor.
William A. Twining
by W. E. Donnelly
his Atty.

No. 757,696. PATENTED APR. 19, 1904.
W. A. TWINING.
GEAR CUTTING MACHINE.
APPLICATION FILED JAN. 27, 1902.
NO MODEL. 3 SHEETS—SHEET 2.
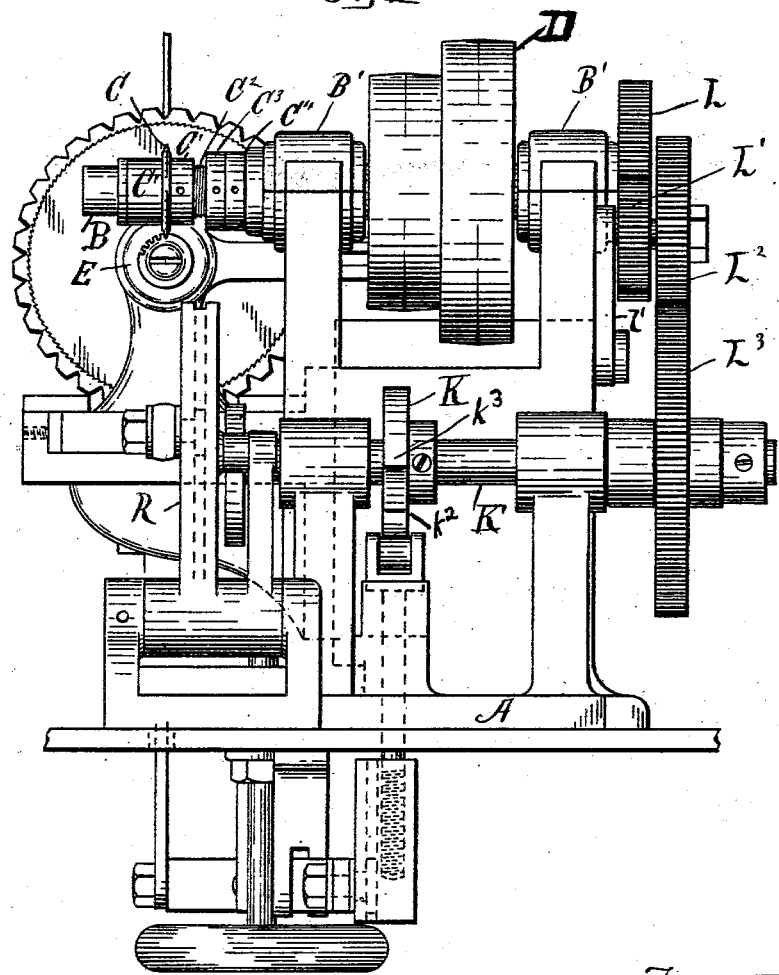
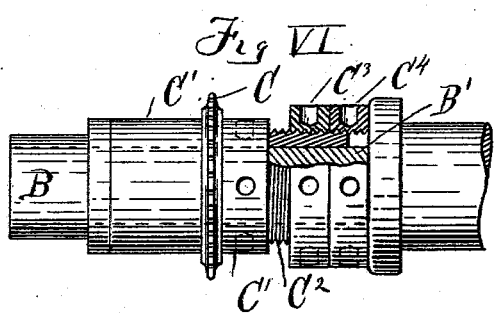
Witnesses:
A. L. Lord.
E. B. Donnelly.
Inventor.
William A. Twining
by W. E. Donnelly
his Atty.

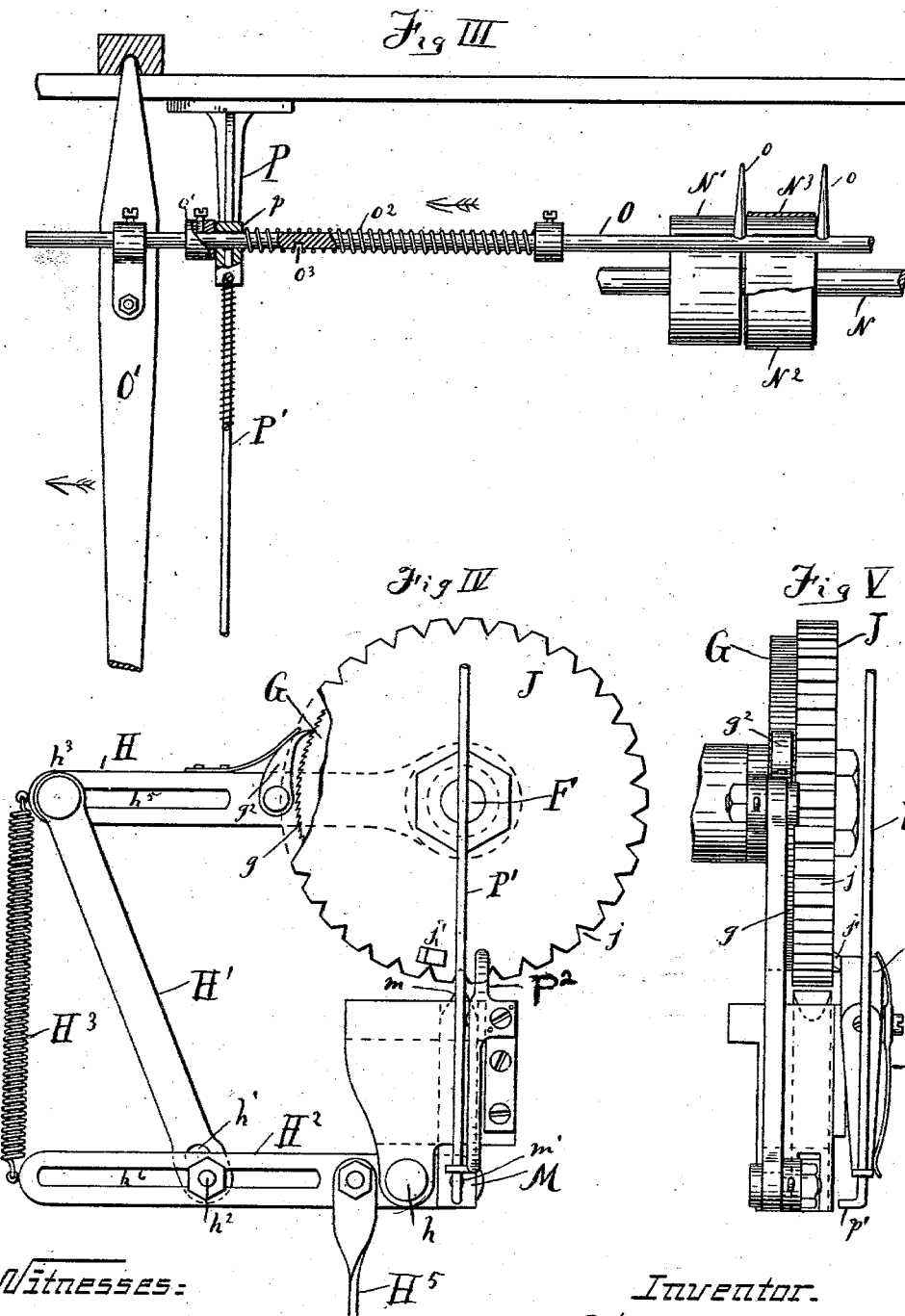

No. 757,696. Patented April 19, 1904.

UNITED STATES PATENT OFFICE.

WILLIAM A. TWINING, OF CLEVELAND, OHIO, ASSIGNOR OF ONE-HALF TO EDWARD A. ALBRIGHT AND CHARLES O. BARTLETT, OF CLEVELAND, OHIO.

GEAR-CUTTING MACHINE.

SPECIFICATION forming part of Letters Patent No. 757,696, dated April 19, 1904.

Application filed January 27, 1902. Serial No. 91,479. (No model.)

*To all whom it may concern:*

Be it known that I, WILLIAM A. TWINING, a citizen of the United States, residing at Cleveland, in the county of Cuyahoga and State of Ohio, have invented certain new and useful Improvements in Gear-Cutting Machines; and I hereby declare the following to be a full, clear, and exact description of the invention, such as will enable others skilled in the art to which it pertains to make and use the same.

My invention relates to machines for cutting gears, the object being to provide a machine that is positive in its action, even in its movement, and certain of registering, and one which after the work is finished shall automatically cease operation.

With the above objects in view my invention consists in the structural features and in combination of parts hereinafter set forth.

In the drawings, Figure 1 is a front view in elevation of the machine embodying my invention, taken on a line with the axis of the cutter. Fig. 2 is a view in side elevation of the machine, taken on a line with the axis of the chuck or work-holder. Fig. 3 illustrates my improved construction of belt-shifter for the purpose of controlling the action of the machine. Figs. 4 and 5 are views in side elevation and in top plan view, respectively, of the indexing devices. These figures illustrate, furthermore, means whereby the belt-shifter may be operated in such a manner as to stop the action of the machine, and also illustrates the stopping device connected with the indexing means whereby the actual position of the stop is predetermined. Fig. 6 illustrates a cutter-mandrel with a view to setting forth the manner in which the cutter may be adjusted in relation to the axial line of the blank-holding chuck.

A represents a base-plate upon which the operative parts of the mechanism are supported.

B represents a mandrel-shaft which includes a cutter-spindle, on which is supported the cutter C, which is adapted to mill or form predetermined spaces. Cutter C is necessarily changed, according to the desired cutter-groove to be made, cutters of different contours being substituted as the work requires. The spindle or shaft B is suitably mounted in bearings B' and is controlled in its movement and driven by means of a cone-pulley D, being thus designed to be driven at varying speeds, according to the size and shape of the cutter used with the work. The cutter C is mounted upon the shaft B, preferably as shown in Fig. 6 of the drawings. By securing said cutter between the sleeves C' C', which are adjustably secured upon the shaft B by means of screw-threaded sleeves $C^2$, the cutter C can be adjusted longitudinally along the shaft B in either direction. Lock-nuts $C^3$ and $C^4$ are employed to securely lock the parts, including the cutter, in a predetermined position. This adjustment should at all times register with the axial line of the chuck holding the work, and this is especially necessary in gear-cutting.

E represents a suitable chuck adapted to hold the work during the cutting of the gear-teeth. Chuck E is mounted upon the shaft F, suitably mounted in bearings $B^2$, and is so constructed with relation to its bearing as to obviate the springing of any of the parts due to the action of the cutter upon the work. The chuck E may be of any suitable construction adapted to retain blanks or work to be operated upon in a desired position. To the end of the shaft F opposite to the chuck I have provided an automatic indexing mechanism embodying the following features: G represents a ratchet-wheel, which is provided with a series of peripheral teeth $g$, which are formed so as to have a very fine or close pitch and are engaged by a spring-pressed pawl $g^2$, as seen in Figs. 4 and 5, by means of which the wheel G is advanced at predetermined intervals to a certain degree. The advancement of wheel G by means of the pawl $g^2$, and hence the amount of rotation of the blank contained within the chuck E, is directly consumated through pivoted lever H, which is pivoted to and around the shaft F, which lever carries the spring-pressed pawl $g^2$ in such a position as to be in contact with the teeth $g$ of the wheel G. The lever H is connected to a link-arm H' by means of a bolt $h^3$, which extends through the slot $h^5$ of said lever. This link-arm has its lower end provided with a slot, in which is mounted the bolt $h^2$, said bolt extending through the slot $h^6$ of the lever $H^2$, which is pivotally mounted at $h$ and extends in parallelism with the lever H. To properly hold the levers in their proper relation with link H', there is provided a spring $H^3$, which is connected at its ends with the outer ends, respectively, of levers H and $H^2$. By the connections above set forth the link H' is adjustable lengthwise of both levers H and $H^2$, and thereby controls the throw of the lever H and the consequent movement of the wheel G, inasmuch as said wheel G receives its movement from the pawl $g^2$, communicating with the teeth $g$, carried on said wheel. To further insure the desired amount of throw given to the wheel G, there is employed a locking or gage wheel J, with mechanism set forth hereinafter. The wheel J is connected to the shaft F, upon which the chuck E is rigidly mounted, and therefore at all times moves with said shaft and ratchet-wheel. It is necessary that the lever H in its relation with the lever $H^2$ should be provided with a certain amount of slip or lost motion, and this has been provided for by forming the slot $h'$ in the lower end of the link H', as has been before set out. The spring $H^3$, in connection with these parts, serves the further purpose of preventing rattling thereof.

The mechanism for operating the rotary adjusting and feed movements is illustrated very clearly in Fig. 1 of the drawings, and it consists of a cam K, mounted upon the shaft K', said shaft being in turn connected to the shaft of the cutter C by means of a series of gearing L L' $L^2$ $L^3$, said gearing being connected to their shafts and supports in such a manner that they may be removed and replaced by others to impart the desired speed to the shaft K' in relation to the shaft of the cutter C. The gear-wheel L' is supported by pivoted arm $l'$, as shown in Figs. 1 and 2. The cam K is so constructed that it acts first through wheel $k$ and plunger $k'$ to move the pivoted lever $H^4$, which at its farther end is connected to the pitman-rod $H^5$ and through said pitman-rod $H^5$ to the lever H, pawl $g^2$, and ratchet-wheel G, giving to said ratchet-wheel G the necessary throw, according to the adjustment of the parts. For the above objects cam K, as shown in Figs. 1 and 2, is formed with a lead $k^2$ and an abrupt stop $k^3$. The roller or wheel $k$ is held against the cam-face $k^4$ by means of a weighted rod $x$, which acting downwardly on the pivoted lever $H^4$ forces the plunger $k'$ upwardly, thus seating roller $k$ upon the face of the cam K. Upon the rotation of the shaft $k'$ in the direction of the arrow the roller $k$ runs down the lead $k^2$, forcing downwardly the plunger $k'$, and thereby actuating the lever $H^4$ and pitman $H^5$, and by forcing the latter upwardly forces upward link H', attached to the lever H, thereby moving the wheel G, as heretofore described. The lock-piece M is carried by the lever $H^2$ and has its V-shaped end adapted to enter one of a series of V-shaped notches $j$, formed in the periphery of the gaging and locking wheel J. Upon reaching the end of the lead $k^2$ the roller $k$ goes over the same and up the abrupt stop $k^3$, thus allowing the rod $x$ to quickly throw forward the plunger $k'$ and withdraw by the above-described connections pivoted lever $H^4$ pawl $g^2$ from wheel G and lock-piece M from wheel J. This action of the locking part M, in connection with the wheel K, brings said wheel, and with it the ratchet-wheel G with the work in the chuck E, to a predetermined position, allowing said pawl to slip one tooth or more along said ratchet-wheel G, the slot $h'$ allowing said ratchet-wheel to throw back the pawl $g^2$, and lever H, thus bringing said locking-wheel J, as before stated, to an absolutely-predetermined position and locking it rigidly in said position until the cutter C has passed through the work on the chuck E. The gaging and locking wheel J is changed according to the desired pitch of the gear, and hence is removably connected to shaft F.

The longitudinal feeding movement of the chuck E and the blank contained therein is accomplished by means of a rock-arm R, to which pitman S is adjustably secured. The pitman S is also adjustably secured to the slide T, which supports the bearing $B^2$, through which the shaft to which chuck E is attached runs. The rock-arm R is operated by means of a cam R'. (See Figs. 1 and 2.) This cam R' is provided with a lead $k^5$ and an abrupt stop $k^7$, which engage the roller $k^6$, attached to the rock-arm R. The roller $k^6$ rests against the face of the cam R' and upon rotation of the same draws forward the slide T by means of its connection to the rock-arm R and the above-described mechanism; but upon the roller engaging the abrupt stop $k^7$ the spring $y$ pulls down lever-arm Y of the bell-crank lever, and thus retracts the whole slide to normal position or position for a new cut by the cutter C, whereupon the slide is again fed forward, as above described. During this movement the pawl $g^2$ of the ratchet-wheel G and the stop $m$ for the gage-wheel J slide in their respective teeth and are in position when the slide is retracted by said spring $y$ to perform their respective functions upon the movement of the plunger K' and roller $k$. After the locking and gaging wheel J has made a full revolution and the cutter C has cut the requisite number of teeth on the blank the machine is automatically stopped by the following mechanism.

N represents the counter-shaft upon which the tight and loose pulleys N' and $N^2$ are located. These pulleys N' and $N^2$ are located approximately parallel with the cone-pulley D, and a belt N³ conveys the motion and power from the counter-shaft to the machine through this pulley D.

O is a shifting rod which has means for engaging the belt N³, such as studs o o, one located on either side of the belt. Shifting means, as handle O', is connected to the rod O for the purpose of moving the same in the direction of the arrow, as seen in Fig. 3.

P is a bracket, rigidly secured, through which the rod O passes, and this bracket P is provided with a journal p for the passage of the rod O. On one side this bracket is engaged by an adjustable collar o', secured to the rod O, and on the other side by a spring o², surrounding the rod O, permitting the same to be shifted in the direction of the arrow, thereby shifting belt N³ onto the tight pulley N'. As the shifting rod O is moved in the direction of the arrow and the belt N³ is shifted on the pulley N' a slot o³, formed in the rod O, is engaged by a spring-retracted rod P', holding the said rod O against the pressure of spring o, thereby holding the belt N on the tight pulley N'. In order to release or stop the machine, the rod P' (see Fig. 5) is extended down to the point below wheel J, where it is provided with an offset portion p', adapted to enter a hole m' in the locking-bar M, and which is held away from the locking-bar until the cam j'', secured to the wheel J, comes in contact with the pivoted lever P², with which said rod P' engages. The said offset portion p' of the rod P' is held in contact with the hole m' of locking-bar M by means of the lower outwardly-inclined end of lever P², to which said rod P' is attached. This outward throw of the lever P² is effected by the piece j'' on the wheel J on rotation of the same, thereby forcing the rod P' toward M and the offset p' into the hole m'. Lever P² is normally forced toward the wheel J by spring B³. Thus it will be seen that after the wheel J has traveled so that the cam j'' has reached the upper end of the lever P² that the end p' of the rod P' is forced toward the locking-bar M, and when the same is on its outward movement the said end p' will engage with the hole m', as seen in Fig. 4, and draw the rod P' downwardly and release the shifting rod O, allowing the spring o² to return the belt N³ to the loose pulley N², thereby stopping the operation of the machine.

The vertical adjustment of the chuck E is attained by means of a slide W, attached to the support for the chuck E, which carries thereon an internally-screw-threaded bearing E, in which turns the threaded screw U, which is swiveled to the frame at e', and whose rotation tends to raise or lower said bearing E' and with it the slide W and chuck E.

What I claim is—

1. In combination with the chuck of a gear-cutting machine, an index device comprising a ratchet-wheel, and a gage-wheel connected to the chuck and rotatable therewith, a pair of spring-held levers having a link adjustably connected thereto, with a spring-pressed pawl carried by one of the levers engaging the ratchet-wheel, a locking means actuated by the movement of said levers for engagement with said gage-wheel, and means connected to said levers for actuating the same, a vertically-movable plunger connected to said last-named means, and a cam for actuating said plunger.

2. In a gear-cutting machine, the combination of a chuck, an indexing device secured to the chuck, comprising a ratchet-wheel and a locking-wheel, means for revolving said ratchet-wheel comprising a pair of spring-held levers, a link connected to said levers, a spring-pressed pawl carried by one lever engaging the ratchet-wheel, a locking-piece to engage the locking-wheel secured to the other lever, a cam, a plunger actuated by said cam, a lever having one of its ends connected to said plunger, and a pitman actuated by said last-named lever and being operatively connected to one of the first-named levers.

3. In a gear-cutting machine, the combination of a chuck, an indexing device secured to the chuck comprising a ratchet-wheel and a locking-wheel, means for rotating said ratchet and locking wheels comprising slotted levers, a pawl carried by one of said levers for engaging said ratchet-wheel, a link, connected to said levers, and having its securing means engaging the slots of said levers, a locking means for engagement with said locking-wheel, and means for simultaneously actuating said levers and locking means, whereby said pawl and locking means will be alternately moved into engagement with the ratchet-wheel and locking-wheel respectively.

4. In a gear-cutting machine, the combination of a chuck, an indexing device comprising a ratchet-wheel and a locking-wheel, a pair of spring-pressed levers adjustably connected by a link, a spring-pressed pawl carried by one of said levers for engagement with said ratchet-wheel, a locking-piece for engaging said locking-wheel carried by the other lever, a pitman connected to the last-named lever, a plunger, a lever having its ends connected to said pitman and plunger respectively and means for actuating said plunger.

5. In a gear-cutting machine, in combination with a belt-shifting means including a spring-pressed rod having means thereon engaging the belt and supporting means therefor, of an indexing means comprising a ratchet-wheel, a locking-wheel, and means for actuating the ratchet-wheel, a locking member formed with an opening and being carried by said ratchet-wheel-actuating means, a rod normally engaging said belt-shifting means and having its lower portion formed with an inturned lug, said ratchet-wheel-actuating means including a pivoted lever for forcing said rod inwardly whereby its lug will engage the opening of said locking member, and a cam carried by said wheel for actuating said last-named lever.

6. In a gear-cutting machine, the combination of a chuck, an indexing device comprising a ratchet-wheel, a locking-wheel, a pair of slotted levers, a spring interposed between and connected to said levers, a link adjustably connected to said levers, a pawl carried by one of said levers engaging said ratchet-wheel, a locking means secured to the other lever for engagement with the locking-wheel, a pitman connected to said last-named means, a lever connected to said pitman, a weight connected to said last-named lever for returning the first-named levers to their normal positions, a cam, and a plunger carrying a roller engaging said cam and being operatively connected to said last-named lever.

Signed at Cleveland, county of Cuyahoga, and State of Ohio, this 1st day of November, 1901.

WILLIAM A. TWINING.

Witnesses:
W. E. DONNELLY,
E. B. DONNELLY.